United States Patent [19]

Brown

[11] Patent Number: 5,275,547

[45] Date of Patent: Jan. 4, 1994

[54] MOLD ASSEMBLY WITH FLEXIBLE MEMBRANE

[75] Inventor: Robert L. Brown, Hartville, Ohio

[73] Assignee: GenCorp Inc., Fairlawn, Ohio

[21] Appl. No.: 816,899

[22] Filed: Jan. 3, 1992

[51] Int. Cl.⁵ .......................................... B29C 45/14
[52] U.S. Cl. ............................... 425/129.1; 249/127;
                                    249/183; 264/313; 425/DIG. 44
[58] Field of Search ................ 425/DIG.; DIG. 4, 13,
                                    389, 417, 405, 584; 249/127, 65,
                                    249/134, 183; 264/313, 314

[56] References Cited

U.S. PATENT DOCUMENTS

| | | | |
|---|---|---|---|
| 4,449,904 | 5/1984 | Austen et al. | 425/97 |
| 4,482,515 | 11/1984 | Buhler et al. | 264/102 |
| 4,576,776 | 3/1986 | Anderson | 264/510 |
| 4,588,368 | 5/1986 | Buhler et al. | 425/546 |
| 4,704,082 | 11/1987 | Buhler et al. | 425/389 |
| 4,889,668 | 12/1989 | Kemp | 264/40.5 |
| 5,087,193 | 2/1992 | Herbert | 425/417 |

Primary Examiner—Tim Heitbrink

[57] ABSTRACT

A mold assembly (10) for injection molding material including a mold base (12), a clamping plate (14) and a flexible membrane (16). The flexible membrane has a retainer portion (29) engaged within a groove (28) in the mold base, and secured in position clamped intermediate the clamping plate and mold base. The clamping plate and membrane form a mold cavity (54) having a desired configuration for forming the molding material injected into the mold assembly (10). The mold base (12) and flexible membrane (16) form a pressure cavity (56) which is supplied with fluid during the injection of molding material into the mold assembly, to support the flexible membrane (16) in the desired position.

11 Claims, 4 Drawing Sheets

MOLD ASSEMBLY WITH FLEXIBLE MEMBRANE

TECHNICAL FIELD

The present invention relates to a mold assembly for injection or pressure molding articles, and more particularly to a mold assembly for the injection molding of articles within a mold cavity formed in part by a flexible membrane.

BACKGROUND OF THE INVENTION

Mold assemblies currently available for injection or pressure molding articles are typically formed from rigid materials such as steel or other metal materials. In the past, such metal mold assemblies have generally consisted of multiple plate machined or, if in large quantity, cast molds. The molds are generally pre-heated to a desired temperature, clamped or compressed within an injection molding system, and injected with the desired molding material. The injection of the molding material is typically accomplished using an injection system having an injection press.

The production of such die molds having cavities for molding desired items is a time consuming and expensive process. Manufacture of the mold itself to the desired specification, may take many weeks. Additionally, where such fixed dimension molds are used for joining two or more separate molded pieces together, problems may result. For example, where it is desired to join elongate pieces of polymer material which are generally produced by another process, such as extrusion, such pieces may have individual size variations as great as 15% or more. Consistently forming a quality joint between pieces having such different sizes may be difficult to achieve, and may result in a molded article which does not meet desired aesthetic standards.

In the past, the joint molding of separate elongate pieces has been performed using machined or cast molds having spaces formed within the mold for receiving the pieces to be joined. Such molding processes have the distinct disadvantage of obtaining molded articles having an unattractive "step offs" or discontinuous joint lines between the elongate pieces and the molded joint material. Depending on the diameter and cross-sectional configuration of the elongate pieces, a separate mold may be required for joining different size and types of pieces.

Another disadvantage of conventional mold processes is that the molded articles produced typically require additional processing to remove flash from the articles. The formation of flash, and its removal, result in further increased costs due to wasted material, and the additional process of deflashing the article, or removing the excess material, and finishing the article. An additional quality control inspection of each article may also be required, which further increases the overall labor expense of the system.

SUMMARY OF THE INVENTION

The present invention provides a new and improved mold assembly having a flexible membrane for injection or pressure molding articles from polymer materials typically cured by the application of temperature and pressure. As used herein, the term "cure" is intended to include treatment by the application of either heating or cooling temperatures, cross-linking of the material to be cured, and other material treatments whereby the molding process is completed and the material to be molded attains its finished condition.

The mold assembly of the present invention includes a mold body or base, a clamping plate and a flexible membrane. In the embodiment of the present invention for joining separate pieces of extrudate, the mold assembly additionally includes extrusion guide blocks. In the preferred embodiment, the mold base, clamping plate and guide blocks may be formed of any structurally adequate material. The clamping plate of the mold assembly is preferably of a conductive material, while the mold base and guide blocks are preferably of an insulating material. In the event an insulating material such as ceramic, for example, is used, the mold base and blocks may be quite inexpensive to manufacture. Even where more expensive metal materials are used, the mold base, blocks and clamping plate are inexpensive and may be quickly manufactured, relative to prior die cast or machined molds.

The flexible membrane is also relatively fast and inexpensive to manufacture, even when complex cross-sectional or surface geometry configurations are required for engagement with the elongate pieces of extrudate being joined. The membrane is preferably made of a silicone polymer material. The silicone material has heat resistance sufficient to withstand the heat generated by electrical heating filaments and wires molded within the membrane, and to engage the heated molding material being injected adjacent the membrane.

Where adjustment of the mold assembly is necessary to accommodate engagement with extrudate pieces or sections having large dimensional variations or different configurations, inserts may be added to the clamping plate. Alternatively, the flexible membrane may be readily changed to a size, shape or other variation more appropriate for the sections being joined.

In the example of the illustrated invention, the mold assembly is configured for joining two elongate pieces of extrudate, and the overall membrane configuration is shaped to match the finished product requirements, or is substantially L-shaped. Likewise, the membrane in the illustrated example has a generally U-shaped cross-sectional configuration, such that the cross-section matches the geometry of the extrudate in the section which is contacted by extrudate, but may vary depending on the application requirements of the mold area. The membrane additionally includes a retainer portion or retaining bead, at the end of each leg of the U-shape, for engagement within a corresponding groove formed in the mold base. By engaging the retaining bead within the groove, the membrane is secured intermediate the clamping plate and mold base once the clamping plate is secured in position.

In the example of the present invention, the mold base has a substantially square overall configuration, and includes an L-shaped trough, and L-shaped grooves, one spaced from each side of the trough, for receiving the membrane retaining beads, and an inlet port through the mold base to the trough.

The extrusion guides are positioned for engagement with the sides of the mold base having the trough and groove end cutouts or openings. The guides and mold base may be secured together by any internally or externally positioned conventional fasteners. The guides each include end openings formed through the guide for receiving and supporting the elongate pieces of extrudate. Each side of the extrusion guide which engages the mold base also includes a partial trough and groove end cutout or opening for receiving an end of the flexible membrane. The extrusion guides additionally may include a serrated portion, with serrations extending from the surface of the central opening for engagement with the extrudate sections. Engagement of the serrated portion with the extrudate sections, together with compression of the clamping plate with the mold base, clamps the extrudate sections and prevents removal of the sections from the extrusion guides during the injection of material into the mold assembly.

The clamping plate comprises a cover plate for engaging and retaining the flexible membrane within the trough and groove formed in the mold base. The clamping plate includes at least one sprue opening for injecting molding material through the clamping plate into the membrane. To accommodate variations in the size of extrudate sections being molded together, the clamping plate may additionally include an insert engaged within the opening in the membrane between the retaining beads. The insert may be formed integral with the clamping plate, or may comprise a separate insert piece secured to the clamping plate by conventional fasteners. The use of such inserts allows matching of the profiles of the extrudate sections, and thereby eliminates flash or other discontinuities at the location of the joint material and extrudate sections.

Once the extrudate sections are positioned within the extrusion guides, the clamping plate is secured to the mold base with the insert engaged with the membrane. In this closed position, a mold cavity is formed by the clamping plate and membrane, and by the extrudate pieces to be joined. The clamping plate may be secured to an upper portion of the press, which is movable into engagement with the mold base. Alternatively, the clamping plate and mold base may be secured together by conventional fasteners positioned either internally or externally of the mold base and clamping plate.

A pressure cavity is also formed between the trough of the mold base, the flexible membrane and the extrusion guides. The pressure cavity is supplied with fluid during the injection of molding material into the mold assembly to support the membrane and enable molding of the material to the desired configuration. In the event the injection pressure is unknown, a pressure sensor may be placed within the pressure cavity, to provide a closed loop pressure system which is operated by a control system. However, if the injection pressure is known and repeatable, a pressure sensor is not required.

The pressure cavity of the present mold assembly pressures the membrane such that the mold assembly is under the appropriate pressure or pre-loaded, and the pressures resulting from injection of the molding material are contained by the mold assembly. Only the sprue opening in the clamping plate, which enables access to the mold cavity of the assembly, remains open and thus is required to be contained or clamped by an external force during the injection operation.

During the injection operation the mold assembly is maintained within an injection system for a time sufficient to cure, set or partially cure the material within the sprue opening. Material is provided to the pressurized or pre-loaded mold cavity via the sprue opening. Because the sprue opening is typically small in size, the temperature and pressure conditions during injection result in rapid changes to the material within the sprue opening. These rapid changes cure the material within the sprue to prevent the removal of material or reverse material flow out of the mold. Thus, the mold need only be maintained in clamped or compressed position during the injection operation within an injection press of an injection system to cure the material within any sprue openings.

In conventional molding techniques, the injection system press, applies the necessary external force for clamping the mold. Using such conventional techniques, the cross-sectional area of the entire mold cavity is not pre-loaded pressurized. During such operations, the clamping force required to be applied to the mold to resist the separation force tending to separate the clamping plate from the mold base is transferred to the injection system.

In the present invention, prior to the injection of material into the mold assembly, the mold cavity is preferably pre-treated with any necessary coatings, and the membrane is heated to a desired temperature using heating wires to assist with curing of the material. Likewise, the clamping plate is preferably preheated prior to the injection operation, and may include heating wires of the type described in connection with the membrane. The extrusion sections are provided with any inserts or other internal elements to be included within the article to be molded. The extension pieces are also secured within the extrusion guides by compression of the clamping plate and serrations. Upon completion of such pre-treatment or pre-injection processes, the clamping plate is secured to the mold base to secure the membrane.

The mold assembly is then moved into position for engagement with an injection press nozzle for injection of the molding material. The control system choreographs operation of the injection system for injection of the molding material into the mold assembly, and, for example, reading, calculating and making appropriate adjustments of the pressure within the pressure cavity and the temperature of the heated flexible membrane, to ensure proper shape and curing of the article to be molded.

Other features and advantages of the present invention will become apparent from the following detailed description of the preferred embodiment made with reference to the accompanying drawings, which form a part of the specification.

DETAILED DESCRIPTION OF THE PREFERRED EMBODIMENT

Figure 1:
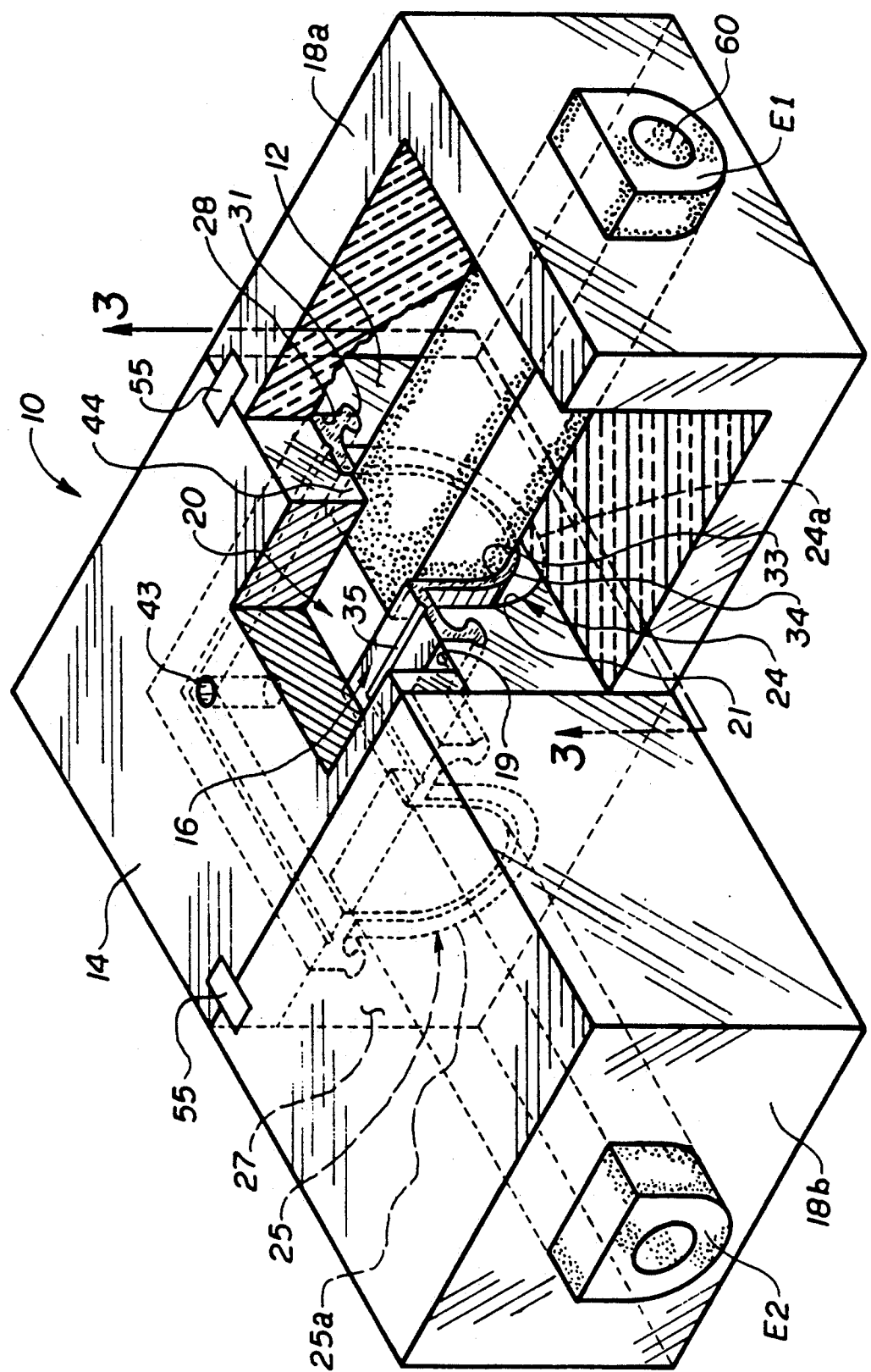
FIG. 1 is a schematic, partially cross-sectional view of a mold assembly constructed in accordance with the present invention.

FIG. 1 illustrates a mold assembly of the present invention for injection or pressure molding of material cured by the application of temperature and pressure. The mold assembly, generally referred to at reference numeral 10, preferably includes a mold base or body 12, a clamping plate 14 and a flexible membrane 16. The embodiment of the mold assembly 10 illustrated in FIGS. 1-2 additionally includes extrusion guide blocks 18a, 18b.

Figure 2:
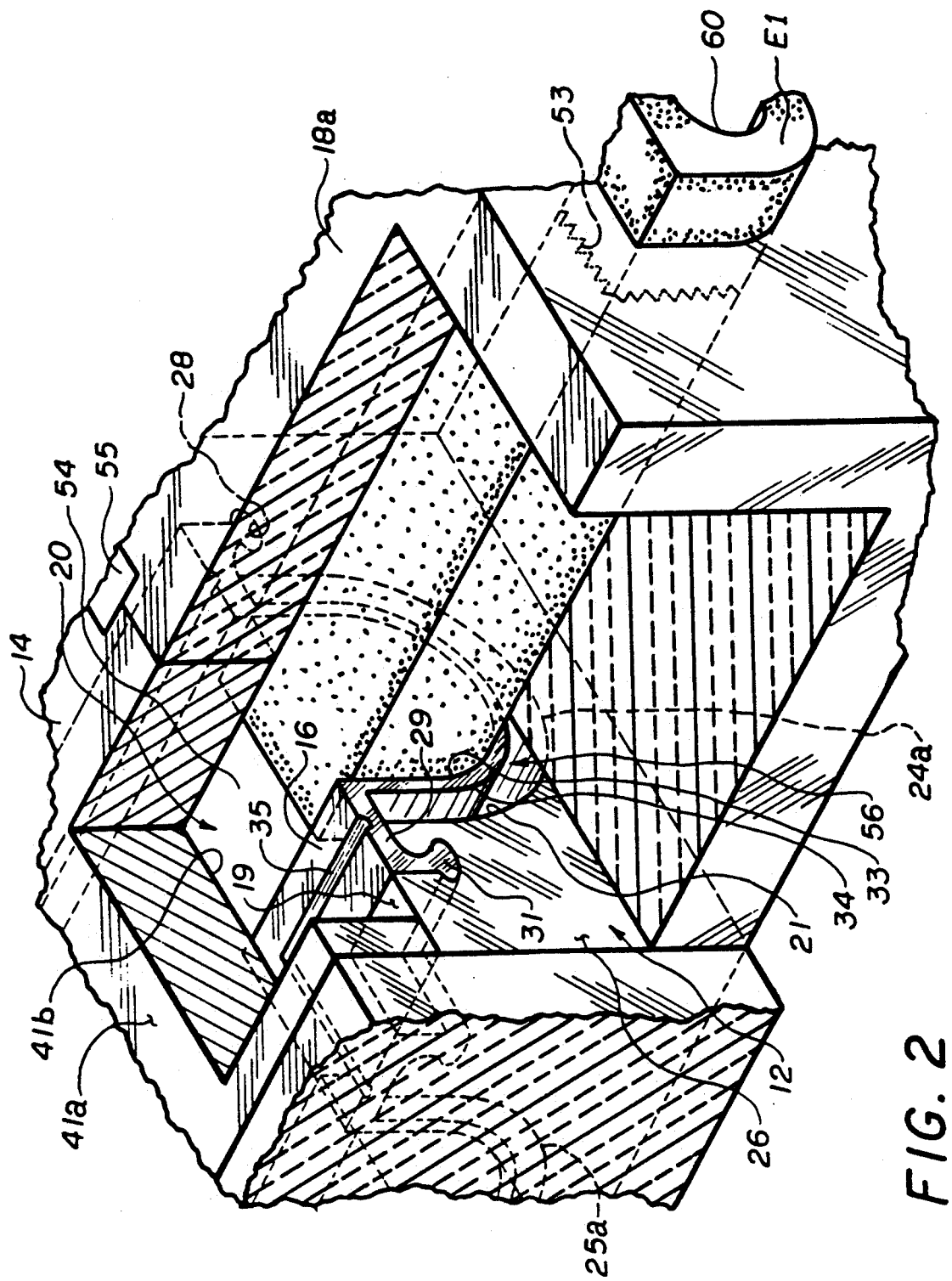
FIG. 2 is an enlarged schematic, partially cross-sectional view of the mold assembly illustrated in FIG. 1.
Figure 3:
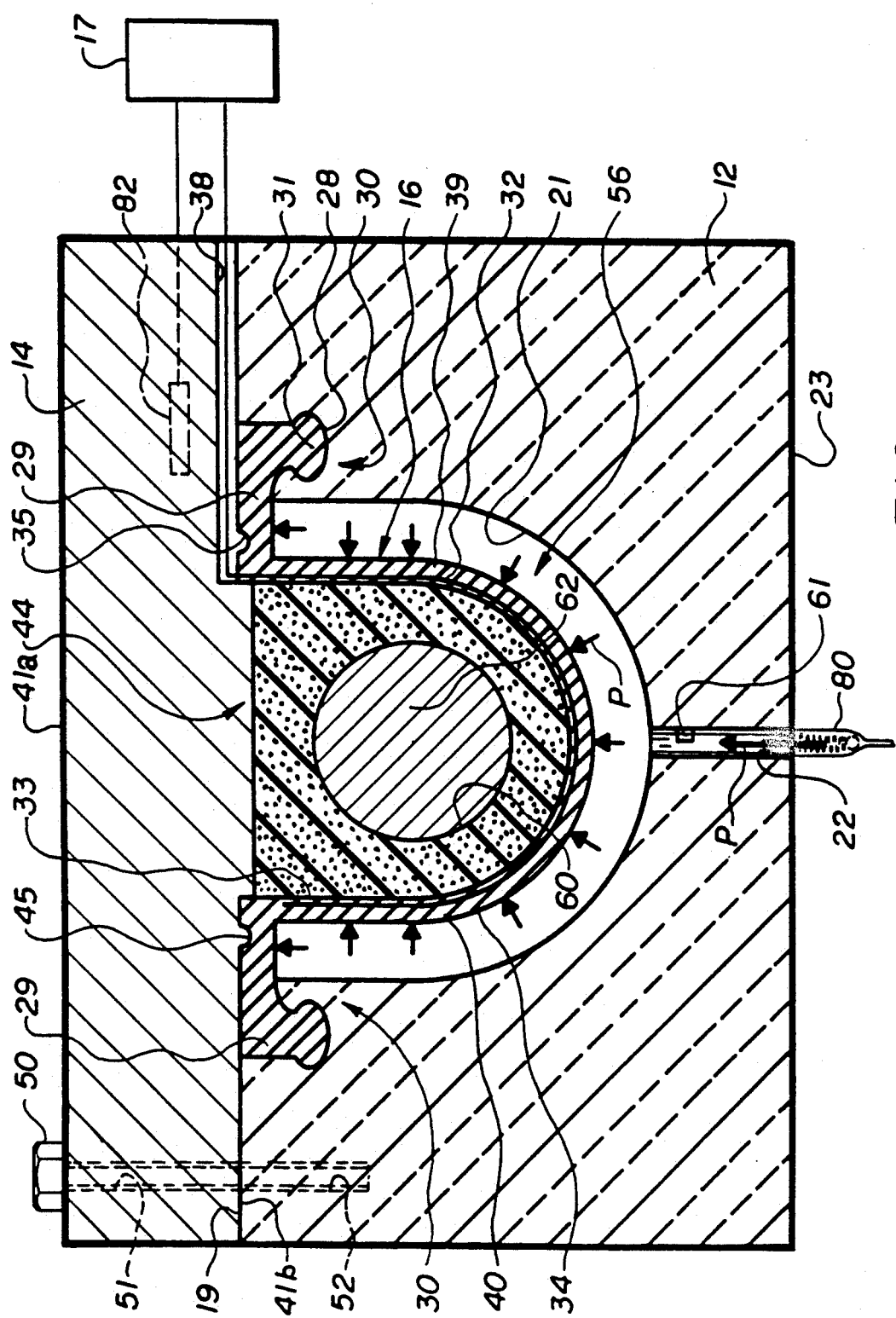
FIG. 3 is a schematic, cross-sectional view of the mold assembly taken along the line 3—3 in FIG. 1.

The mold base and guide blocks, 12, 18a, 18b are preferably constructed of an insulating material, such as ceramic or a polymer material, and are thus easily and inexpensively manufactured to the desired size and configuration. The clamping plate 14 is preferably manufactured of a conductive material. In the preferred and illustrated embodiment, the mold base 12 has a rectangular or square shaped configuration and includes a top surface 19 and a bottom surface 23. In the illustrated embodiment, for example, an L-shaped trough 20 is formed in the top surface 19, and includes a concave surface 21. It is understood that such surfaces are or may be formed to any configuration in order to obtain the desired final molded product. An inlet port 22 is formed through the bottom surface 23 of the mold base 12 and the concave surface 21 of the trough 20. Thus, the inlet port 22 provides access from the exterior of the mold base to the interior of the mold base and the trough 20. The trough 20 has first and second ends 24, 25 forming U-shaped openings 24a, 25a in the corresponding side surfaces 26, 27 of the mold base. Grooves 28 are also provided in a top surface 19 of the mold body. The grooves 28 may be of any configuration adapted for cooperatively receiving retainer portions 29 of the flexible membrane 16. As illustrated in FIGS. 2 and 3, the grooves 28 are formed within the top surface 19 of the mold body adjacent each edge 30 of the trough 20.

The flexible membrane 16 is of a size and configuration which substantially corresponds to the trough 20 and grooves 28 of the mold base 12. The flexible membrane 16 used in the present invention has an inside surface 33 and a pressure surface 34, and further includes a silicone polymer member which includes an integral heating wire 32 molded within the membrane. As specifically shown in FIG. 3, the heating wire 32 is molded within the membrane adjacent the inside surface 33 of the flexible membrane in order to transfer the necessary heat to the material being molded in order to assist curing of the material. As schematically shown in FIG. 3, the heating wire 32 is interconnected with a control system 17 including a conventional power supply. The wire 32 is connected via an opening 38 formed in the clamping plate 14 and between the mold base and flexible membrane.

The U-shaped configuration of the flexible membrane 16 illustrated has first and second legs 39, 40 and retainer portions 29 attached and extending from each leg. The configuration of the membrane 16 may be of any cross-sectional shape desired to be molded within the assembly. Additionally, the configuration of the retainer portions 29 may likewise be of any shape which corresponds with the grooves 28 to enable mirror image engagement with the mold base 12. Each retainer portion 29 in the illustrated embodiment includes a bulb member 31 and a lip groove 35. The lip groove 35 is formed within the retainer portion adjacent the location where the legs 39, 40 join the retainer portions 29.

The clamping plate 14 includes a top surface 41a and an engagement surface 41b with a sprue opening or runner 43 forming a passage through said plate 14 for providing the material being injected to the mold assembly 10. Heating wires or filaments 82 may also be provided within the plate for heating the mold assembly prior to or during injection. The engagement surface 41b of the clamping plate 14 includes a seat portion 44 which corresponds to the size and configuration of the opening formed between the first and second legs 39, 40 of the flexible membrane 16. The seat portion 44 may be formed integrally with the clamping plate, and/or a separate part having the desired size to match the profile of the opening of the flexible membrane. The engagement surface 41b of the clamping plate also includes lip portions 45 for engagement with the lip grooves 35 formed in the retainer portions 29 of the flexible membrane.

When the clamping plate 14 is secured in its operating position covering the flexible membrane 16 which covers the trough 20 of the mold base 12, the lip portions 45 are engaged with the lip grooves 35 of the flexible membrane, and the seat 44 is engaged with the flexible membrane intermediate the first and second legs 39, 40, as illustrated in FIGS. 1-3. Once the flexible membrane is engaged within the grooves 28 and trough 20 of the mold base 12, and the clamping plate 14 is engaged with the flexible membrane and mold base, the mold assembly is in the operating position. In the embodiment wherein the clamping plate 14 is secured to the injection press, the assembly is then in the operating position.

Where the clamping plate is not so secured, conventional fasteners 50 may then be engaged within openings 51, 52 in the clamping plate and mold body, respectively, to clamp the clamping plate, flexible membrane and mold body into operating position for injection of the desired molding material. Additionally, conventional alignment pins or floats may be provided in the clamping plate for cooperating engagement with the injection press to ensure that the mold assembly is properly positioned in engagement with the injection press, such that the runner 43 is properly positioned with respect to an injection nozzle of the press.

In the operating position, the lip 45 and seat 44 of the clamping plate 14 also provide an alignment function with the lip grooves 35 and membrane 16, such that the clamping plate is properly positioned on the mold base. In this position the lip 45 and lip grooves 35 provide sealing engagement of the membrane intermediate the plate and base during compression of the mold assembly by the injection press. Such sealing engagement prevents leakage of pressurized fluid and injection material across the lip by pinching the membrane, and thereby sealing and containing the stresses to the membrane resulting from injection forces.

In the embodiment of FIGS. 1-3, wherein the art being molded is a corner piece joining two adjacent extruded pieces E1, E2, extrusion guide blocks 18a, 18b form a portion of the mold assembly 10. Specifically, the guide blocks 18a, 18b are positioned as shown in FIGS. 1 and 2, immediately adjacent the first and second ends 24, 25 of the trough 20 in the mold base and associated ends of the flexible membrane 16 engaged with the side surfaces 26, 27 of the mold base. The guide blocks 18a, 18b include a longitudinal, or other corresponding opening, for engagement with the previously extruded pieces E1, E2 to be joined during the molding operation. The guide blocks 18a, 18b are aligned in position such that the internal openings 24a, 25a and flexible membrane 16 are aligned for engagement by the similarly shaped extruded pieces E1, E2. Once in an aligned position, the guide blocks 18a, 18b are secured in engagement with the mold base via conventional fasteners or clamps 55, schematically illustrated in FIG. 1. Alternatively, the guide blocks 18a, 18b may be secured in aligned engagement with the mold base during the injection operation by the injection press. As shown in FIG. 2, the extruded pieces are held in position within their respective guide blocks 18a, 18b upon compression of the clamping plate by the injection press, and engagement of serrations 53 on the guide blocks with the extruded pieces E1, E2.

Once the flexible membrane 16 is secured intermediate the clamping plate 14 and mold base 12, and the guide blocks 18a, 18b are engaged with the clamping plate and/or mold base, a mold cavity 54 is formed by the clamping plate, membrane and the extruded pieces engaged within the guide blocks. In the event the extruded pieces E1, E2 to be joined are formed with a hollow center 60 of the type illustrated in FIG. 2, extrusion supports 62 are inserted within the extruded pieces as shown in FIG. 3. In such cases, the extrusion supports also form a portion of the mold cavity 54. A pressure cavity 56 is likewise formed between the concave surface 21 of the trough 20 of the mold base, the extrusion guide blocks 18a, 18b and the pressure surface 34 of the flexible membrane 16.

During the injection operation, the mold assembly 10 is first provided to an injection press. Once engaged with the injection press, a nozzle (not illustrated) is engaged with the sprue opening 43, and an actuator device applies a force required to maintain engagement during injection. The application of force by the injection press maintains the clamping plate and mold base in clamping engagement with the flexible membrane. As set forth in U.S. Pat. No. 5,183,605, issued Feb. 2, 1993, the injection press may be of a variety of constructions.

Once the injection press applies pressure to the mold assembly, the pressure cavity 56 is supplied with pressurized fluid, as illustrated by the arrows P in FIG. 3, to support the flexible membrane 16 during the injection operation. Pressure sensor 61 is positioned within the pressure cavity 56 or inlet port 22, as also illustrated in FIG. 3. Once the desired pressure level is obtained by supplying the necessary fluid P, the pressure sensor 61 transfers a signal to the control system 17 Thus, a closed loop pressure system is provided by the pressure sensor 61 and control system 17, which signals the injection press to commence the injection operation. It should be understood that a pressure sensor is not required in the event the pressure applied is known.

Once the injection operation begins, the pressurized fluid P supports the pressure surface 33 of the flexible membrane 16 during the injection operation such that the pressures resulting from injection of the molding material are contained within the mold assembly 10. Additionally, sufficient fluid pressure is also provided to enable use of the membrane to secure the extruded pieces within the guide blocks by compressing, squeezing or "pinching" the pieces, and thereby preventing their pulling or blowing out of engagement within the guide blocks during injection.

Once the injection operation is completed and the mold cavity 54 is filled with the desired molding material, the mold assembly 10 continues to be maintained within the injection press for sufficient initial curing of the molding material, either within the sprue opening or the mold cavity 54 itself. Upon release of the mold assembly 10 from the injection press, the pressurized fluid P is released from the pressure cavity 56. As the injection press disengages from the mold assembly, in the embodiment where the clamping plate is secured to the press, the clamping plate is correspondingly removed from the mold base. In an embodiment where the clamping plate is secured to the mold base by conventional fasteners, the fasteners securing the clamping plate, mold base and extrusion guide blocks must be disengaged.

Once the clamping plate is removed from the mold base, the molded part, including the molding material and now joining extruded pieces, may be removed from the flexible membrane. In the event is it desired to maintain the fluid pressure within the cavity 56, a valve 80, such as a conventional spring-valve, may be provided to maintain the necessary pressure within the cavity once the mold assembly is released from the injection press.

The flexible membrane 16 and other necessary elements of the mold assembly 10 are then prepared for a next molding operation. Where conventional fasteners 50, 55 are used, they are again engaged with the mold assembly. The mold assembly is then transported to the injection press to repeat the molding operation previously described.

Figure 4:
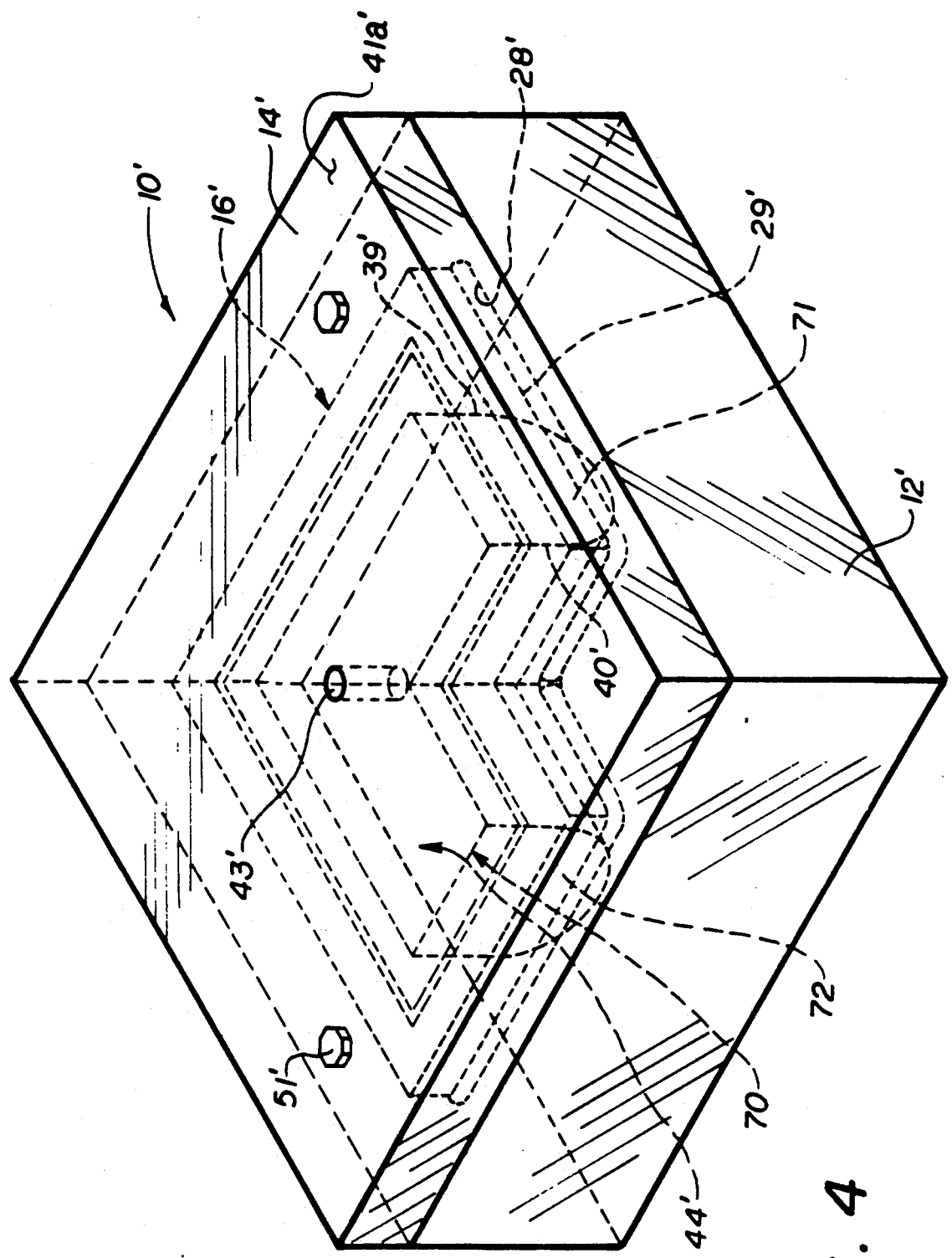
FIG. 4 is a schematic view of an alternate embodiment of the mold assembly of the present invention.

In a second embodiment of the invention illustrated in FIG. 4, the item to be molded is a single element which does not include previously extruded pieces. Instead, a molded item of a desired configuration is formed within the flexible membrane 16'. As this second embodiment of the mold assembly 10' has components substantially similar to those previously described, the similar components will be referred to using the same reference numerals, but with a single prime designation. Only the differences between this second embodiment and the previously described embodiment will be discussed in further detail.

In the embodiment of FIG. 4, the item being molded has an L-shaped configuration, but may be of any desired configuration. The mold base 12' includes a substantially V-shaped trough. The flexible membrane 16' has a continuous wall 70, such that the legs 39', 40' of the U-shaped cross-sectional portion of the membrane are joined at their ends by walls 71, 72 of silicone polymer material to form a cup-shaped membrane. The retainer portion 29' of the flexible membrane substantially surrounds the continuous wall 70 of the membrane 16'. The clamping plate 14' includes a seat 44' correspondingly configured for engagement within the opening formed by the continuous wall of the flexible membrane.

The preferred forms of the mold assembly 10, 10' have been described above. However, with the present disclosure in mind it is believed that obvious alterations to the preferred embodiment, to achieve comparable features and advantages in other assemblies, will become apparent to those of ordinary skill in the art.

We claim:

1. A mold assembly for injection molding material, comprising a mold base, a clamping plate and a flexible membrane, said flexible membrane having a retainer portion clamped intermediate said clamping plate and mold base to secure said flexible membrane within said assembly;

said mold base and flexible membrane forming a pressure cavity supplied with pressurized fluid during the injection of molding material into said mold assembly, and said clamping plate and flexible membrane forming a molding cavity having a desired configuration for forming said molding material injected into said mold assembly;

said mold base having a port for supplying said pressure cavity with fluid at a predetermined pressure;

said clamping plate having at least one sprue opening for providing molding material being injected into said molding cavity; and said flexible membrane having a heating element for heating said molding cavity to a predetermined temperature.

2. Assembly of claim 1 wherein said flexible membrane is manufactured of a silicone polymer material.

3. Assembly of claim 1 or 2 wherein said molding base is manufactured of an insulating material and said clamping plate is manufactured of a conducting material.

4. An apparatus for injection molding material to form a molded article joined with another molded article, said apparatus comprising a molding cavity formed by a clamping plate, a flexible membrane and said another molded article, said membrane having a retainer portion clamped intermediate said clamping plate and a base portion, said clamping plate and base portion are secured together to clam said retainer portion of sad membrane in position for receiving injection molding material, said base portion and membrane forming a pressure cavity supplied with pressurized fluid during the injection of molding material into said molding cavity to support said membrane in a desired configuration for forming said molding material into said molded article, said base portion having a port for supplying said pressure cavity with fluid at a predetermined pressure, said clamping plate having at least one sprue opening for providing molding material being injected into said molding cavity, and said membrane including a heating element for heating said molding cavity to a predetermined temperature.

5. The apparatus of claim 4 wherein a guide block is secured adjacent said base portion for supporting said another molded article in a position engaged within said membrane during the injection of molding material.

6. The apparatus of claim 5 wherein said another molded article is maintained in position supported within said guide block and membrane by compressed engagement with said clamping plate and engagement with serrations on said guide block.

7. The apparatus of claim 6 wherein said membrane is manufactured of a silicone polymer material.

8. The apparatus of claim 6 or 7 wherein said base portion and guide block are manufactured of an insulating material, and said clamping plate is manufactured of a conductive material.

9. An apparatus for injection molding material to form a single molded article joined with first and second molded articles, said apparatus comprising a molding cavity formed by a clamping plate, a flexible membrane and first and second molded articles, said membrane having an L-shaped configuration and including a retainer portion clamped intermediate said clamping plate, a base portion and first and second guide blocks secured adjacent said base portion for supporting sad first and second molded articles, respectively, in positions engaged within said membrane during the injection of molding material, said clamping plate, base portion and guide blocks are secured together to clamp said retainer portion of said membrane in position for receiving injection molding material, said base portion, membrane and guide blocks forming a pressure cavity supplied with pressurized fluid during the injection of molding material into said molding cavity to support said membrane in a desired configuration for forming said molding material and first and second molded articles into said single molded article, said base portion having a port for supplying said pressure cavity wit fluid at a predetermined pressure, said clamping plate having at least one sprue opening for providing molding material being injected into said molding cavity, and said membrane having an electrical heating element for heating said molding cavity to a predetermined temperature prior to the injection of molding material.

10. The apparatus of claim 9 wherein said first and second molded articles are in part maintained in supported position within their respective guide blocks and said membrane by serrations secured within said guide blocks for engagement with said articles.

11. The apparatus of claim 9 wherein said membrane is a silicone polymer material.

* * * * *